United States Patent [19]

Maciulaitis et al.

[11] 4,165,859

[45] Aug. 28, 1979

[54] SEAL ASSEMBLY

[75] Inventors: Vytautas K. Maciulaitis, Chicago; Rasikant R. Dhanani, Darien, both of Ill.

[73] Assignee: Crane Co., New York, N.Y.

[21] Appl. No.: 798,228

[22] Filed: May 18, 1977

[51] Int. Cl.$^2$ .............................................. F16K 25/00
[52] U.S. Cl. .................................... 251/173; 251/306
[58] Field of Search ............... 251/173, 306, 172, 315, 251/328

[56] References Cited

U.S. PATENT DOCUMENTS

| | | | |
|---|---|---|---|
| 2,965,354 | 12/1960 | Grove | 251/173 |
| 3,612,483 | 10/1971 | Pool | 251/306 |
| 3,642,248 | 2/1972 | Benware | 251/172 |
| 3,986,699 | 10/1976 | Wucik | 251/173 |

*Primary Examiner*—Harold W. Weakley
*Attorney, Agent, or Firm*—George S. Schwind

[57] ABSTRACT

A bi-directional valve seal assembly comprising a retaining ring secured to the valve body, the retaining ring and the valve body each having a recess to form a chamber therebetween, and a seat ring having a base and a pair of diverging legs compressingly located in the chamber.

2 Claims, 4 Drawing Figures

SEAL ASSEMBLY

BACKGROUND AND SUMMARY OF THE INVENTION

This invention relates to a bi-directional sealing assembly having application in valves, especially butterfly valves. Butterfly valves have many advantages over other type valves in fluid flow regulation, most notable of these being low cost of manufacture, quickness of opening and low restriction to fluid flow when fully open. However, these valves have generally been limited to low pressure applications because of their inability to seal tightly at high pressures. In some prior art valves, the seals are located in grooves. In high pressure applications these seals often become dislodged from the grooves when the valves are opened, thereby rendering the valves inoperative. In others, elaborate groove arrangements for preventing seal blow-out increase the initial cost of the valve, raise the cost for repair or replacement of the seals, and increase the possibility of seal damage misalignment. In several types of valves, the contact between the disc and valve must be made so tight to prevent leakage, that opening the valve, especially large size valves, requires a large torque.

In some prior art valves utilizing a groove and an elastomeric seal, the seal can cold flow under the sealing pressures experienced, thereby decreasing seal life. In addition, machining the inner surfaces of the groove is difficult. An inadequate finish on these surfaces will cause excessive wear on the seat ring operating in the groove resulting in early seal failure. Furthermore, the downstream section of the seat ring may deflect under the fluid pressure, resulting in possible seat ring extrusion and damage. In addition, installation of the seat ring into the groove is usually difficult, requiring special techniques and frequently causing seal misalignment. Furthermore, these seals usually are not bidirectional, sealing better when the upstream side of the seal is on a particular side of the valve stem.

In several prior-art valves utilized in high pressure and/or high temperature applications, the seat ring loses the desired preloading on the seat ring face as the seat ring expands. In still other floating seal valves, high pressure fluid, which enters the seal recess when the valve is closed, cannot escape when the valve is opened. This fluid under pressure may cause the seal to blow out.

An object of the present invention is to provide an improved, high performance floating valve seal assembly which will seal tightly at high pressures, will not blow out under high system pressures, and which is operable with a relatively low torque.

A further object is to provide a relatively inexpensive, long-wearing, easily replaceable valve seal assembly.

A still further object is to provide a valve seal assembly which effectively prevents fluid flow in either direction at high pressure when the valve is closed.

The seating which is the subject of this invention comprises a novel seat ring design. In preferred embodiments of the invention shown and discussed herein, a back-up means may also be added to improve the seal performance, although the back-up means is not essential to the successful practice of every embodiment of this invention.

The seat ring is located in a chamber circumferentially surrounding and open to the valve body passage having walls which are easily accessible for providing a smooth finish for extended seat ring life. The back-up means, if utilized, is located in a hollow portion of the seat ring. In the embodiment shown, fluid is permitted to enter the chamber containing the valve seat ring between the seat ring and the recess, forcing the seat ring against the opposite side of the recess and against the disc.

DESCRIPTION OF THE PREFERRED EMBODIMENT

Figure 1:
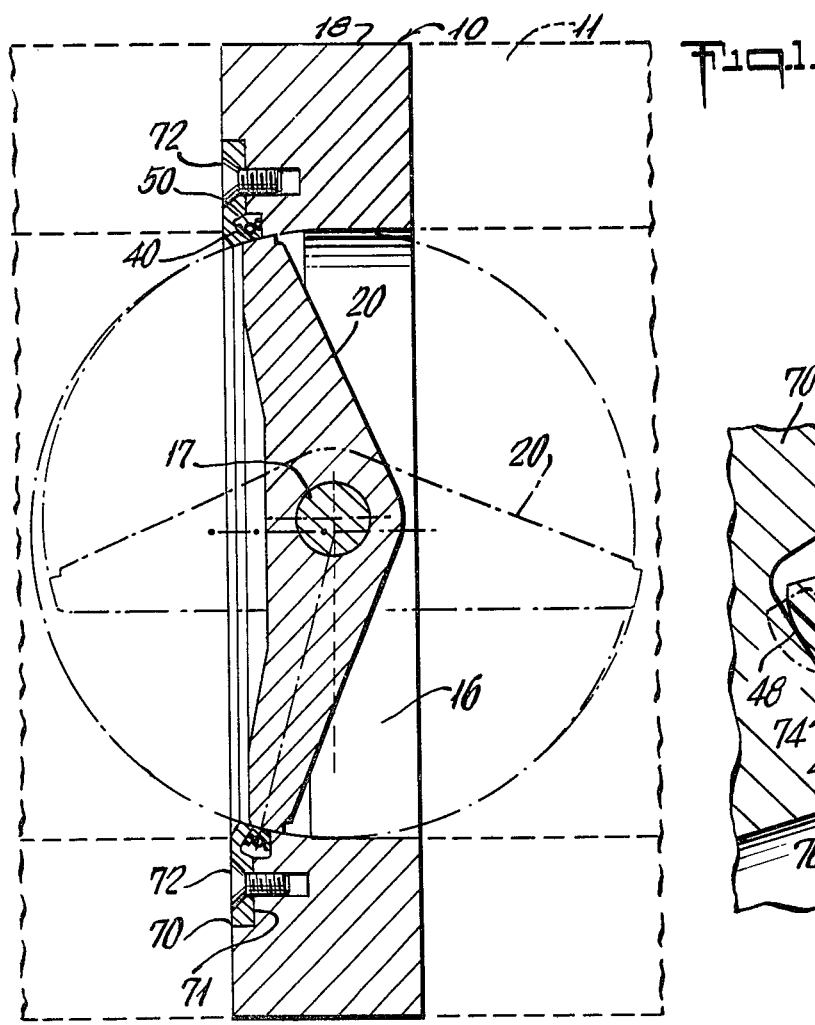
FIG. 1 is a plan sectional view of a butterfly valve utilizing the seal embodiment of this invention with the valve disc shown in solid in the closed position, and in broken lines in the open position.

Referring now to the drawings, and more particularly to the embodiment of FIG. 1, a cylindrical valve generally represented by reference numeral 10 includes a valve body 18 having passage 16 therethrough located in fluid flow line 11. A valve closure means, such as rotatable disc 20, shown in solid lines in the closed position and in broken lines in the open position, is located in valve body 18 and is secured to and pivoted by valve stem 17. Seat ring 40 and a back-up means such as spring 50, are of an overall annular configuration extending around the circumference of passage 16. The seat ring and spring are secured by annular retainer 70 which is fastened to valve body 18 by means of screws 72, as shown. Retainer 70 is removable for insertion and removal of seat ring 40 and spring 50. In this embodiment, the axis of rotation of the disc does not conincide with a centerline through seat ring 40, resulting in eccentric movement of disc 20 relative to the seat ring. This design also affords faster break-away between the disc and the seat ring than would occur with coincidence of centerlines through disc 20 and seat ring 40. The invention disclosed herein is applicable, however, to valves in which there is coincidence of the seat ring and stem centerlines.

The actual offset angle between the seat ring and a plane passing through the stem at a right angle to the valve centerline, which usually ranges between 5 and 30 degrees, is normally determined by an enlarged valve layout and is a function of several variables including the diameter of passage 16, and the diameter of the bearing (not shown) for stem 17. This offset design is common for high performance valves because it eliminates a perforation in the seat ring for the valve stem.

Figure 2:
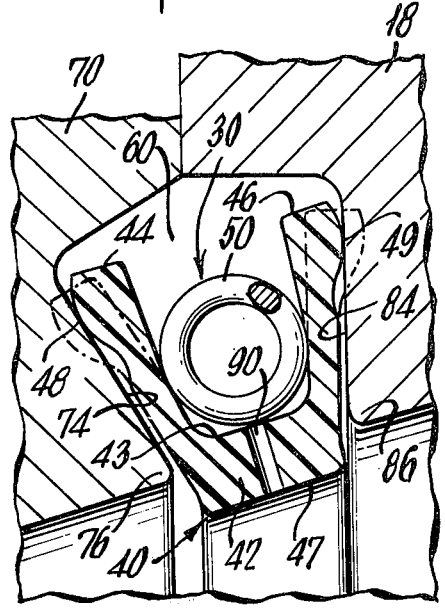
FIG. 2 is an enlargement of one segment of the seal assembly of FIG. 1 with the assembly unloaded, showing the compressed seat ring in solid and the unstressed seat ring in broken lines. The seat ring assembly would be positioned as shown in solid when the valve is open permitting fluid flow through the valve.
Figure 3:
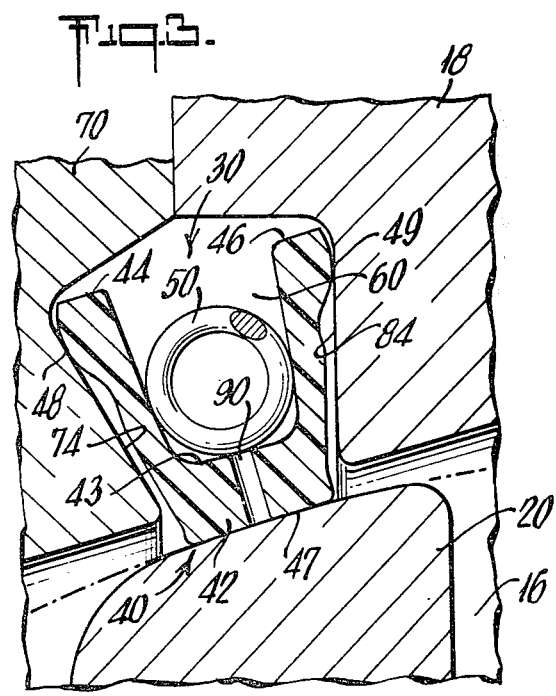
FIG. 3 is an enlargement of one segment of the subject seal assembly in a preloaded condition. Such a condition would occur if the valve disc is closed with no fluid pressure in the valve.
Figure 4:
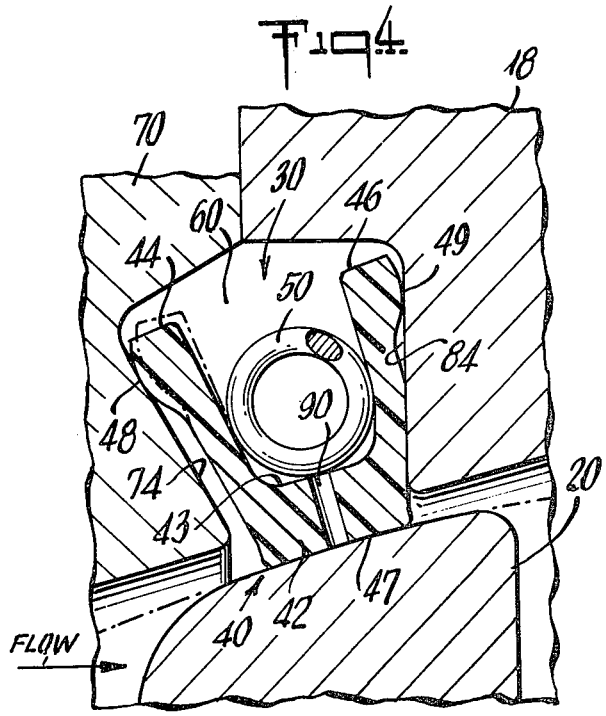
FIG. 4 is an enlargement of one segment of the assembly of FIG. 1 with the seal assembly preloaded and pressurized. This would occur when the valve is closed and under pressure.

Referring now to FIGS. 2, 3 and 4, seal assembly 30 is shown, comprising an annular seat ring 40 and spring 50, located in chamber 60. Circumferential recesses 74, 84, on retainer 70 and valve body 18, respectively, cooperate to converge on the retainer and valve body, to retain seal assembly 30 within chamber 60. However, other similar converging recess shapes also would be satisfactory. Seat ring 40, having a generally flat bottomed crosssectional area, comprises a base 42 with inner surface 43 and outer surface 47, and oppositely diverging legs 44, 46, respectively, extending from said base. In the embodiment shown, the depth of recesses 74, 84 increase equally with increasing distance from passage 16. Movement of seat ring base 42 relative to the chamber is thus nonskewed, resulting in uniform contact across surface 47 by disc 20 when the disc is rotated closed irrespective of the direction of fluid flow. When the seat ring is compressingly inserted into chamber 60, base 42 extends slightly into valve passage 16 for fluid-tight engagement with the valve closure means, such as valve disc 20. Legs 44, 46 should be designed so that seat ring 40 is retained in chamber 60 by shoulders 76, 86 on retainer 70 and valve body 18, respectively, when valve disc 20 is positioned to permit the flow of fluid through the valve. Legs 44, 46 are shown having oppositely facing convex surfaces 48, 49, respectively, designed for fluid-tight engagement with recesses 74, 84, respectively. These convex surfaces are not essential for the successful practice of this invention, however, it has been found that a more fluidtight seal is obtained between each leg and its respective recess, when the area of contact between the leg and the recess is restricted as discussed hereinafter. Seat ring 40 may be of other similar overall designs provided that the seat ring cooperates with recesses 74, 84 and with disc 20 to form fluid-tight seals. Spring 50, located in the hollow portion of seat ring 40 communicating with inner surface 43, forces the legs more tightly against recesses 74, 84, effectuating a tighter seal between legs 44, 46 and recesses 74, 84, respectively. Spring 50 also cooperates with legs 44, 46, to help prevent blow-out of seat ring 40 when disc 20 is opened.

In the embodiment shown, one or more perforations 90 have been made completely through base 42 of ring 40 to further prevent seal blow-out by providing a path for fluid under pressure to escape from chamber 60 into passage 16 when disc 20 is in the open position. In the preferred embodiment, spring 50 minimizes the portion of perforations 90 covered by the back-up means, although other back-up means providing openings through which fluid could pass would also be satisfactory. Seat ring 40 would normally be made of a generally inert, but somewhat resilient material such as fluorocarbon polymer or urethane polymer. Spring 50 normally would be a garter-type spring constructed of a metal chemically resistant to the fluid passing through valve 10.

As shown in FIG. 2, when rotatable disc 20 is in the open position permitting fluid flow through the valve, base 42 extends slightly into valve passage 16.

Referring to FIG. 3, when disc 20 is in the closed position with no fluid pressure in valve 10, the disc contacts surface 47 thereby forcing seat ring 40 deeper into recess 60 and simultaneously forming a fluid-tight seal between the seat ring 40 and disc 20. Legs 44, 46 are not under any fluid pressure and make contact with recesses 74, 84 only at convex surfaces 48, 49, respectively.

Referring to FIG. 4, if fluid has been flowing in the direction shown by the arrow when disc 20 is rotated into the closed position, the disc will contact surface 47 blocking perforations 90 and will form a fluid-tight seal between surface 47 and the disc. Fluid passes between recess 74 and leg 44, and forces the leg into the position shown by the broken line in FIG. 4 for an instant, permitting fluid to fill chamber 60. The fluid thus entering chamber 60 forces leg 46 against recess 84 forming an effective fluid-tight seal. Fluid contacting surface 43 forces surface 47 still more tightly against disc 20. It can be seen that by having a convex surface 49 on leg 46, all the fluid force acting on this leg is concentrated in forming a fluid-tight seal at the point of contact of surface 49 and recess 84, thereby giving a tighter, more effective seal between leg 46 and recess 84. When the disc is opened, fluid in chamber 60 passes through spring 50 and through perforations 90 into passage 16, thereby relieving fluid pressure on seat ring 40 and eliminating the possibility of seat ring blow-out.

It can be clearly seen that the subject seal assembly is symmetrical and effectuates a true bi-directional seal. If fluid were to flow in the opposite direction to that shown and discussed hereinabove, the seal assembly would operate in a directly opposite manner.

In addition to the use of the invention in valves, other areas where effective fluid sealing utilizing the subject invention will become apparent. Similarly, it should be understood that variations and modifications of this invention may be effected without departing from the spirit and scope of this invention.

What I claim is:

1. A valve for controlling fluid flow comprising:
   a. A valve body having a passage therethrough;
   b. A valve closure means pivotally positioned in said valve body;
   c. a stem adapted to rotate said valve closure means; and,
   d. a seal assembly including:
      (i) a recess on said valve body adjacent to said passage, the depth of the recess increasing substantially uniformly with increasing distance from the passage;
      (ii) a retainer overlying the recess in said valve body, said retainer having a recess, the depth of the recess increasing substantially uniformly with increasing distance from the passage, the retainer recess disposed in juxtaposition to the recess on said valve body to thereby form a chamber therebetween adapted to receive a seat ring; and,
      (iii) a seat ring located in the chamber said seat ring having a base extending into the valve body passage and a plurality of legs depending from said base compressingly disposed in the chamber, said base having a perforation being blocked by said valve closure means when said valve closure means is rotated closed, each of said legs having a convex surface thereon adjacent to each respective recess, whereby fluid passing between a recess and one of said legs forces the convex surface on the other leg into fluid-tight engagement with its respective recess and with said valve closure means when said stem rotates said valve closure means into the closed position, the fluid in the chamber passing through the perforation into the passage in said valve body when the stem rotates the valve closure means into the open position.

2. The valve of claim 1 further comprising a backup means located in the chamber contacting said seat ring.

* * * * *